US009799236B2

(12) United States Patent
Moore

(10) Patent No.: US 9,799,236 B2
(45) Date of Patent: Oct. 24, 2017

(54) LOCKOUT TAG

(71) Applicant: REDFAB INC., Coldwater (CA)

(72) Inventor: Michael Moore, Coldwater (CA)

(73) Assignee: REDFAB INC., Coldwater (CA)

( * ) Notice: Subject to any disclaimer, the term of this patent is extended or adjusted under 35 U.S.C. 154(b) by 0 days.

(21) Appl. No.: 15/047,880

(22) Filed: Feb. 19, 2016

(65) Prior Publication Data

US 2016/0247421 A1      Aug. 25, 2016

Related U.S. Application Data

(60) Provisional application No. 62/118,850, filed on Feb. 20, 2015.

(51) Int. Cl.
| | | |
|---|---|---|
| *G06K 19/06* | (2006.01) | |
| *G09F 3/00* | (2006.01) | |
| *G09F 3/08* | (2006.01) | |
| *G09F 13/16* | (2006.01) | |
| *G06K 19/07* | (2006.01) | |
| *G06K 19/077* | (2006.01) | |
| *G09F 3/02* | (2006.01) | |

(52) U.S. Cl.
CPC ....... *G09F 3/0297* (2013.01); *G06K 19/0723* (2013.01); *G06K 19/07758* (2013.01); *G09F 3/08* (2013.01); *G09F 13/16* (2013.01); *G09F 2003/0213* (2013.01); *G09F 2003/0255* (2013.01)

(58) Field of Classification Search
CPC .......... G09F 13/16; G09F 3/0297; G09F 3/08; G09F 2003/0213; G09F 2003/0255; G06K 19/06028; G06K 19/06037; G06K 19/0723; G06K 19/07758
USPC ......................................................... 235/494
See application file for complete search history.

(56) References Cited

U.S. PATENT DOCUMENTS

| 736,299 A | 8/1903 | Rose | |
|---|---|---|---|
| 2,911,743 A | 11/1959 | Pokras | |
| 3,106,374 A * | 10/1963 | Olson | B64F 1/005 174/5 R |
| 3,429,065 A | 2/1969 | Long et al. | |
| 3,890,497 A * | 6/1975 | Rush | G02B 6/001 116/173 |
| 4,462,175 A * | 7/1984 | Romberger | G09F 3/18 40/1 |
| 4,530,178 A * | 7/1985 | Rauscher | A01K 97/08 43/26 |
| 5,026,001 A * | 6/1991 | Wright | G01P 5/165 150/154 |
| 5,411,784 A * | 5/1995 | Brewster | G09F 3/02 40/584 |

(Continued)

FOREIGN PATENT DOCUMENTS

WO    2013/126753 A1    8/2013

*Primary Examiner* — Claude J Brown
(74) *Attorney, Agent, or Firm* — McMillan LLP

(57) ABSTRACT

A lockout tag having an elongate flag; a fastener proximate one end of the elongate flag; a seam proximate an end opposite the fastener; a warning indicia between the fastener end and the seam end of the elongate flag; and the elongate flag formed of a reflective and fluorescent material. The flag further comprising a pouch for additional information regarding the owner and purpose of the flag.

15 Claims, 13 Drawing Sheets

(56) References Cited

U.S. PATENT DOCUMENTS

| | | | | |
|---|---|---|---|---|
| 5,727,818 | A * | 3/1998 | Schmeida | G09F 7/04 |
| | | | | 283/101 |
| D408,865 | S | 4/1999 | Link et al. | |
| 6,004,232 | A * | 12/1999 | Sennott | A63B 67/00 |
| | | | | 473/415 |
| 6,494,065 | B2 | 12/2002 | Babbitt, III | |
| 6,598,800 | B1 * | 7/2003 | Schmit | G06K 19/07758 |
| | | | | 235/462.44 |
| 6,976,786 | B1 * | 12/2005 | Stanley, Jr. | A45C 9/00 |
| | | | | 383/117 |
| 7,254,841 | B1 | 8/2007 | Nelson | |
| 7,401,570 | B2 | 7/2008 | Moore | |
| 7,624,525 | B2 | 12/2009 | Frank et al. | |
| 2010/0326219 | A1 * | 12/2010 | Nelson | B65D 63/00 |
| | | | | 73/865.8 |
| 2013/0024402 | A1 * | 1/2013 | Cundiff | G06Q 30/08 |
| | | | | 705/500 |
| 2013/0214903 | A1 * | 8/2013 | Kalous | G05B 1/01 |
| | | | | 340/5.61 |
| 2015/0328871 | A1 * | 11/2015 | de Castro | B32B 37/025 |
| | | | | 156/230 |
| 2016/0113371 | A1 * | 4/2016 | Dunn | A45C 13/103 |
| | | | | 70/21 |
| 2016/0210548 | A1 * | 7/2016 | Blair | G06K 19/0723 |

* cited by examiner

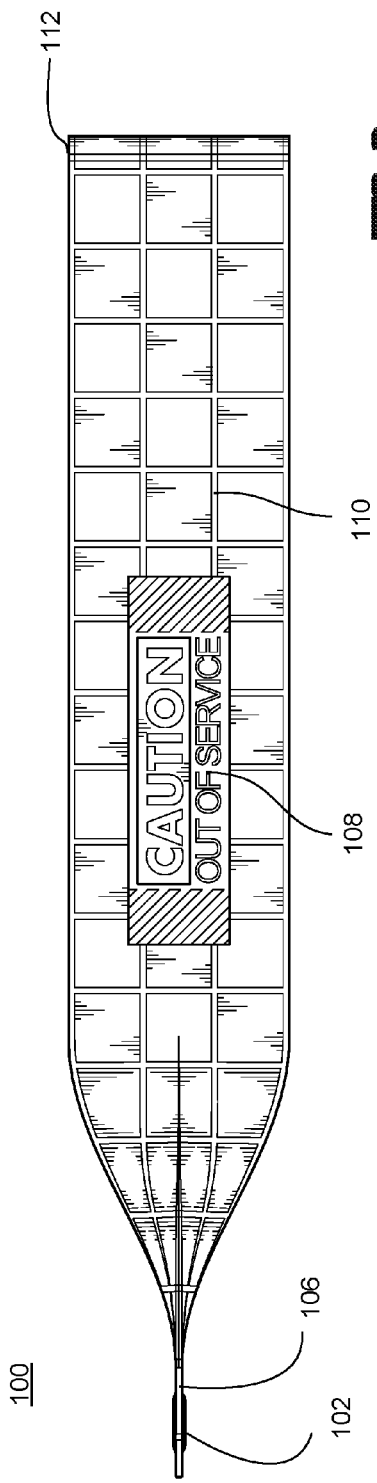
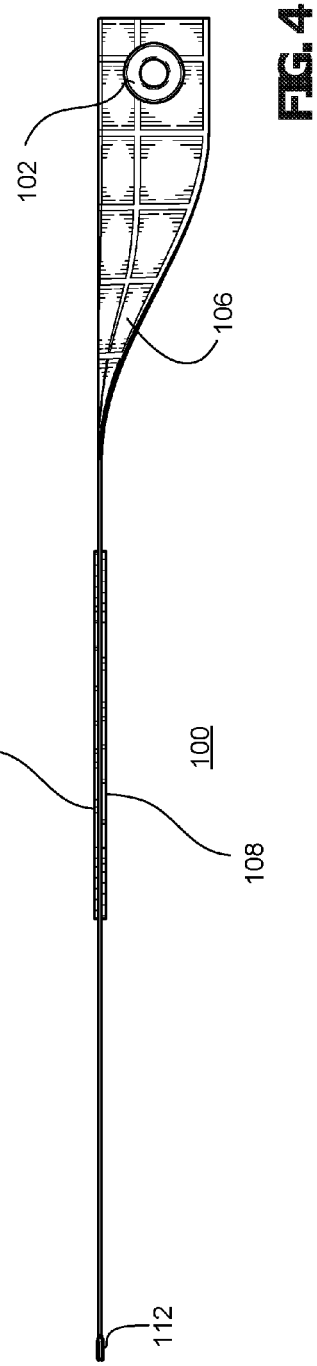

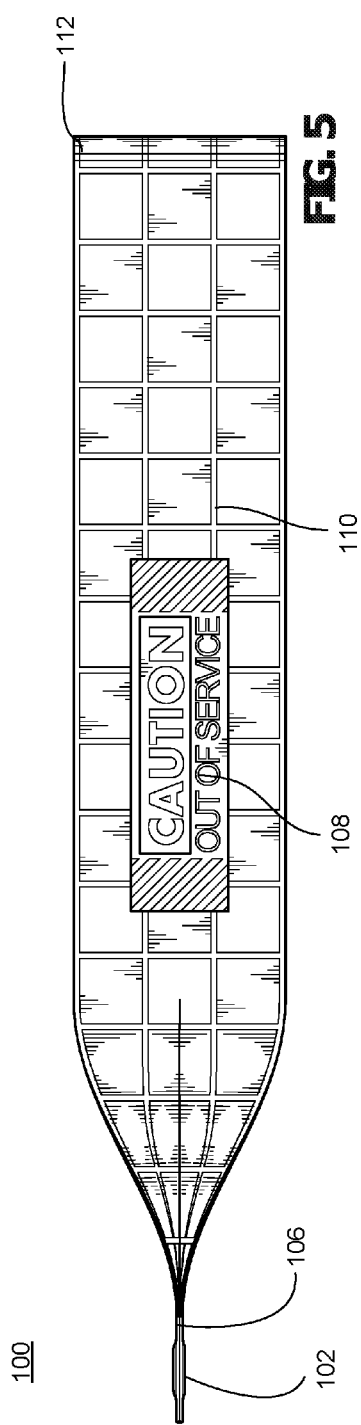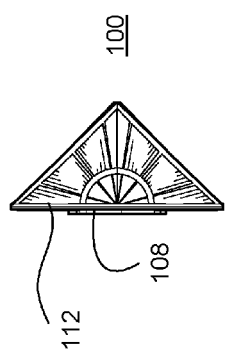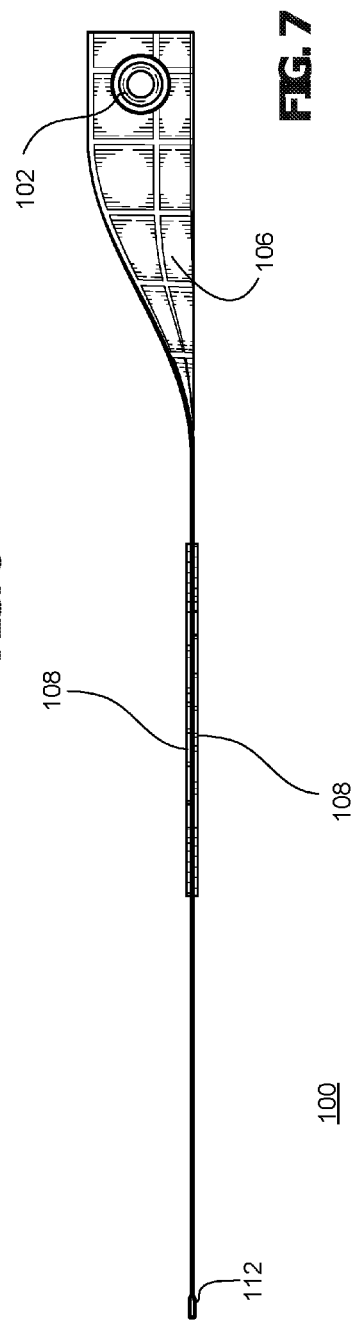

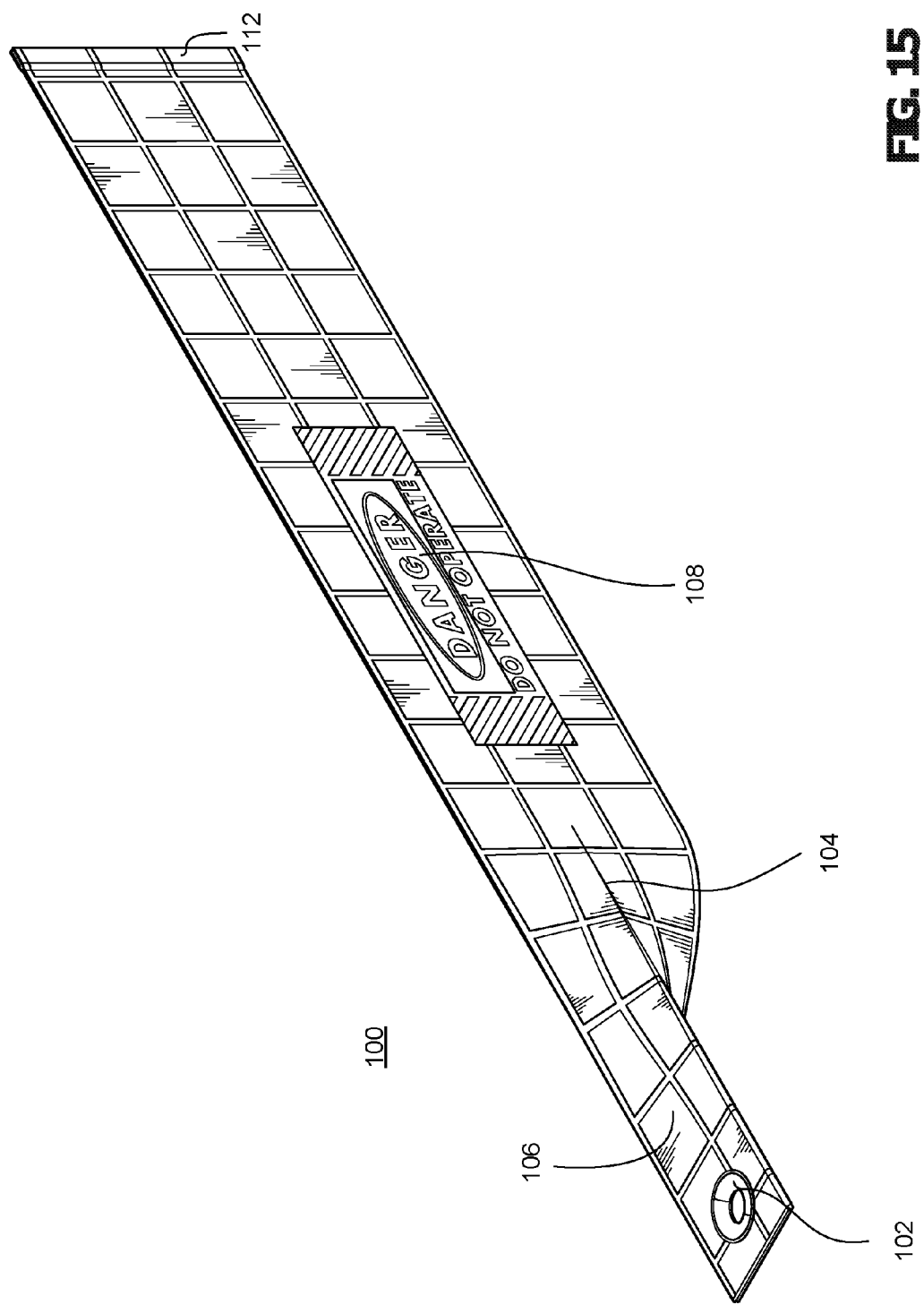

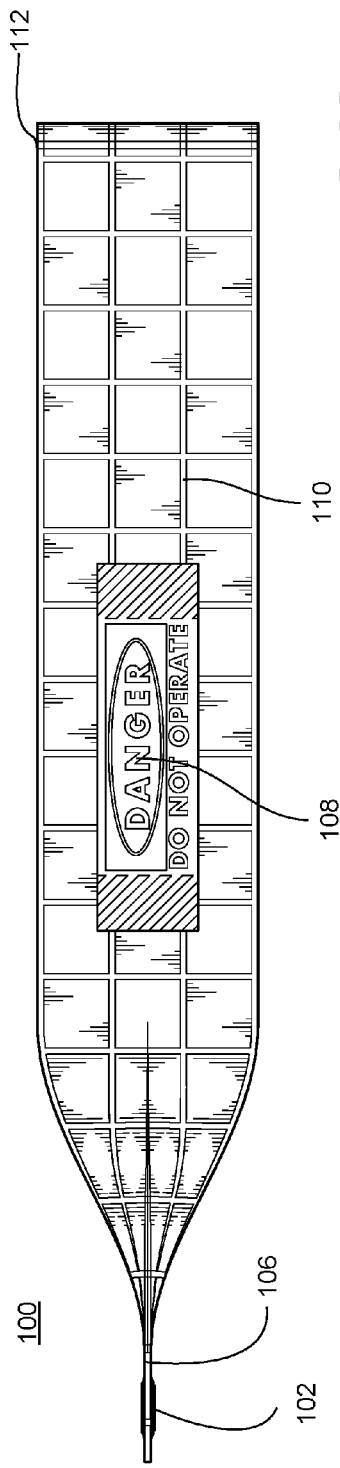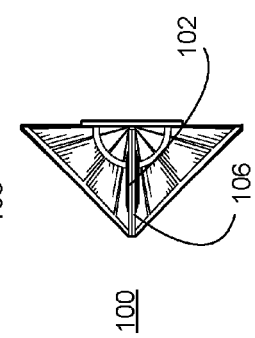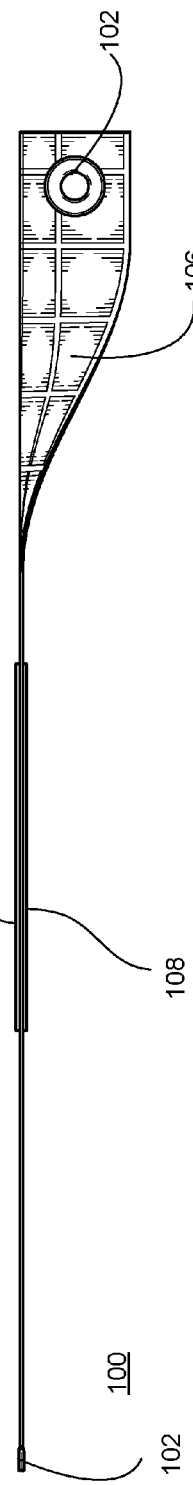

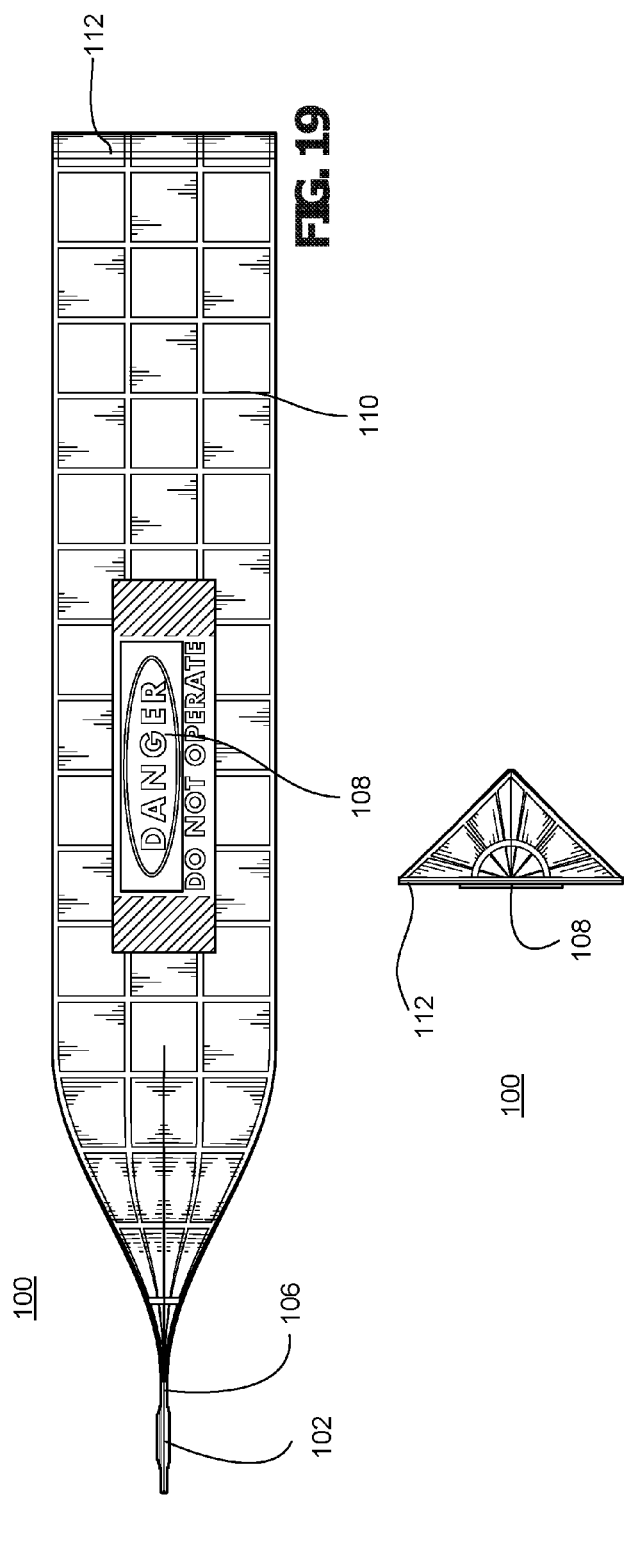

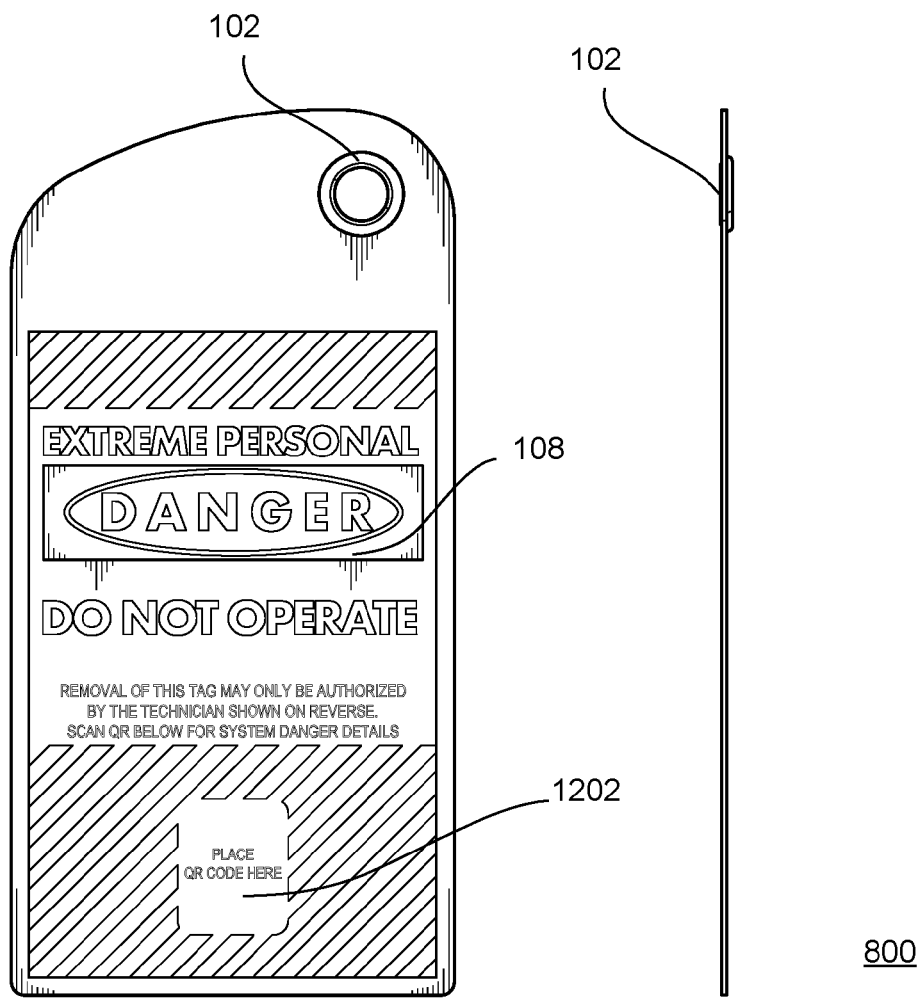

LOCKOUT TAG

CROSS-REFERENCE TO RELATED APPLICATIONS

This application claims the benefit of U.S. Provisional Application No. 62/118,850, filed Feb. 20, 2015, the contents of which are expressly incorporated by reference.

FIELD OF THE INVENTION

The invention relates generally to the field of lockout-tagout devices and procedures, and more particularly to an improved lockout tag.

BACKGROUND OF THE INVENTION

Several countries have lockout/tagout standards for the purposes of preventing injuries and deaths caused by the accidental or untimely start-up of equipment during maintenance or servicing. Portions of these standards deal with proper shutdown or other steps taken to render the machinery inoperative prior to maintenance, energy source management, and user training. In addition, the marking or tagging of machine while it is lined up for servicing or maintenance, or while it is in the midst of such servicing or maintenance forms a part of some of these standards. In any event, even where standards do not exist there are benefits to providing lockout tags or indicia for the tagging or marking of machinery undergoing servicing or maintenance.

One industry in which lockout tags are used is in the servicing of aircraft, particularly small aircraft. These tags are intended to be readily and suitably attached to the aircraft, be highly visible, and provide the appropriate indicia to alert a user to the level of caution required in approaching or entering the aircraft. The level of caution may be presented by the colour of the tag.

Several prior art documents show elements of such lockout tags, for example U.S. Pat. Nos. 7,401,570; 7,624,525; 7,254,841; and 6,494,065; U.S. Design Pat. No. D408,865; and WO 2013/126753, all of which are expressly incorporated by reference. Other tags such as luggage tags are demonstrated in U.S. Pat. No. 736,299; U.S. Pat. No. 2,911,743; and U.S. Pat. No. 3,429,065, all of which are expressly incorporated by reference. These references show various lockout tags or tag systems that have been proposed. However, there is some deficiency in each of them as will be apparent to one skilled in the art following a reading of the disclosure below and its advantages.

Accordingly, there is a need in the art for an improved lockout tag.

SUMMARY OF THE INVENTION

According to one aspect of the invention, there is provided a lockout tag having an elongate flag with a fastener proximate one end of the elongate flag and a seam proximate an end opposite the fastener. An indicia may be located between the fastener end and the seam end of the elongate flag and may be applied using one or more of digital printing, screen printing, woven labeling, or heat transfer printing. The elongate flag formed of a reflective and fluorescent material. The fastener may be a generally circular eye. The seam may comprise at least two layers of a reflective and fluorescent material. The flag may be cut proximate the fastener to form two flaps and the fastener may pass through both flaps. One side of each flap may be affixed to each other.

According to another aspect of the invention, a pattern may be applied to the reflective and fluorescent material of the flag wherein the pattern may be square-shaped. The material may also comprise a dry-erase sheet and a transparent protective cover.

According to yet another aspect of the invention, the flag may further comprise a pouch with an interior for receiving identification media wherein the pouch may have an eyelet and a zipper. The pouch may also have an electronically scannable code such as one of a quick response (QR) code, a bar code, and a radio-frequency identification device (RFID). The electronically scannable code may correspond to an index to data located on a network server.

BRIEF DESCRIPTION OF THE DRAWINGS

Embodiments are now be described, by way of example only, with reference to the attached Figures, wherein:

FIGS. 1-7 show an embodiment of the invention in the form of a "CAUTION" flag;

FIGS. 15-21 show an embodiment of the invention in the form of a "DANGER" flag; and FIGS. 22-29 show an embodiment of the invention in the form of a "DANGER" pouch.

DESCRIPTION OF THE EMBODIMENTS

Figure 1:
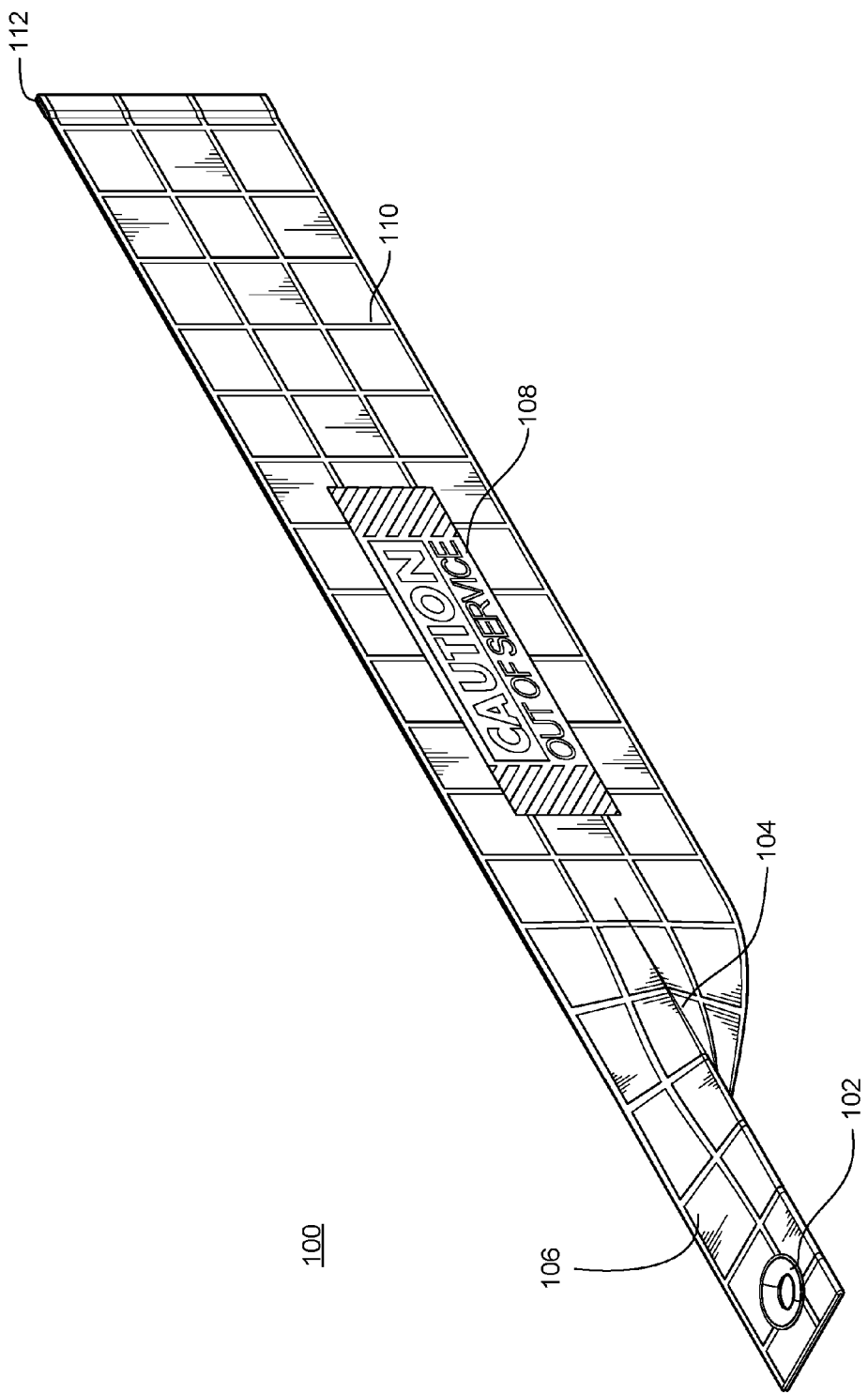
Figure 8:
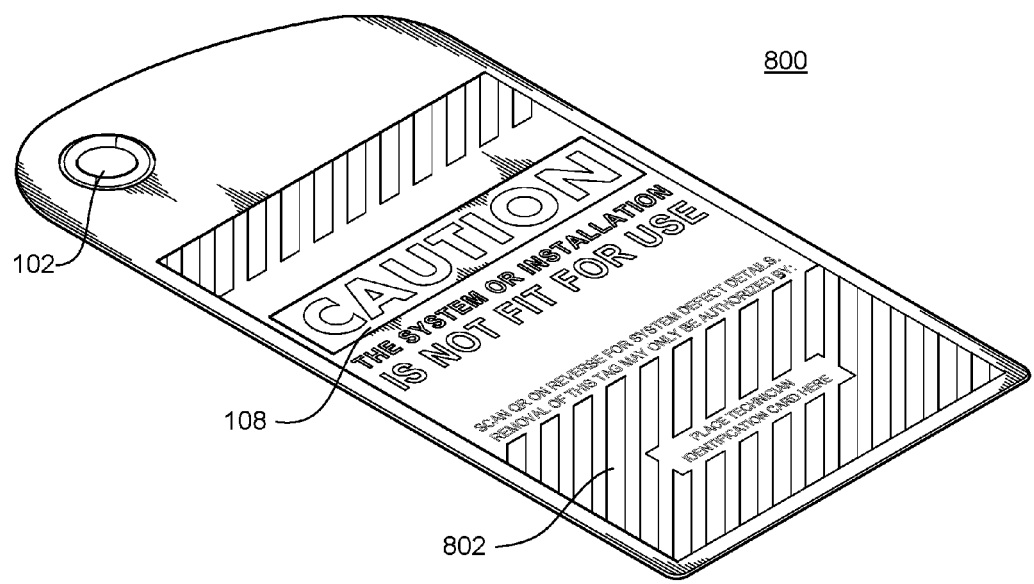
FIGS. 8-14 show an embodiment of the invention in the form of a "CAUTION" pouch.
Figures 9, 10:
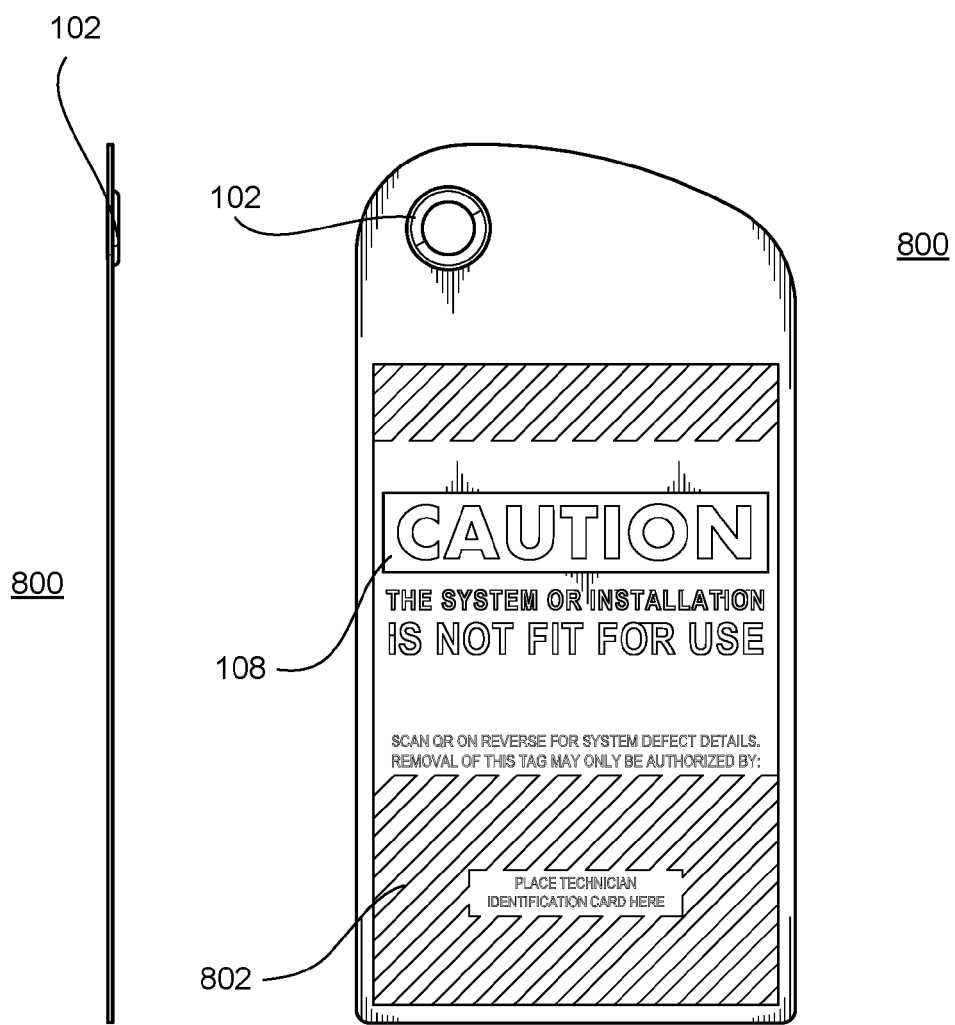
Figure 11:
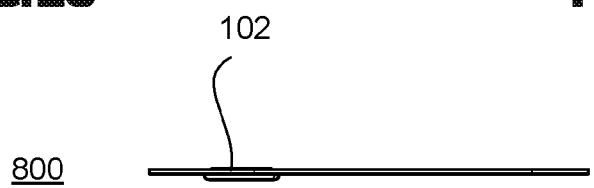
Figure 14:

The various figures referenced above show different tags embodying the inventive combination as described below. The lockout tags may be in the form of a flag 100, which have the benefit of greater visibility, or in the form of a pouch 800, which have the benefit of being capable of holding additional information. The specific text on the lockout tags illustrated in the drawings are for example only and other text in various sizes and production formats may also be applied to the tags using such methods as digital printing, screen printing, woven labeling, or heat transfer printing.

The flag 100, as shown in FIGS. 1-7 and 15-21, are generally elongate in shape and approximately 45 cm long and 8 cm wide. The flag 100 comprises a centrally-located warning indicia 108, a circular eye (or orifice) 102 proximate one end and a seam 112 proximate the other end. The seam 112 may comprise two or more layers, and preferably four layers of material. In the illustrated embodiments, this means for connecting is an eye-type connector which is used to tie the flag onto the machinery. The circular eye 102 or other fastener for connecting to the aircraft of machinery being serviced is provided. The warning indicia 108 may state such messages as "Caution—Out of Service", "Danger—Do not Operate", or other suitable safety message. The circular eye 102 or oval eye-type connector for affixing the flag 100 to an aircraft or machinery being subject to lockout/tagout procedures. In order to improve how the flag 102 hangs (e.g. the indicia facing outward from the attachment point) and the strength of the flag 100 near the eye 102, the flag 100 may be cut 104 at one end and the backside of each flap 106 may be affixed to each other by way of the circular eye 102 or by heat sealing or gluing the two flaps 106 together.

Figure 12:
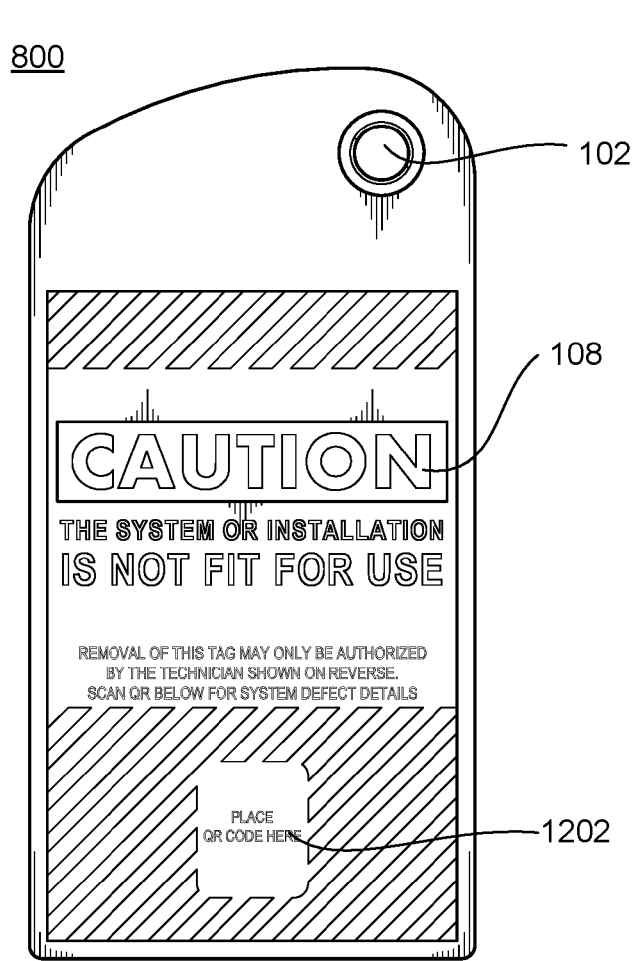
Figure 13:
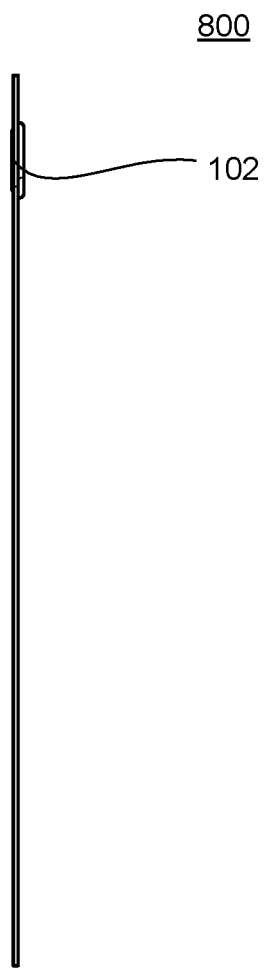
Figure 22:
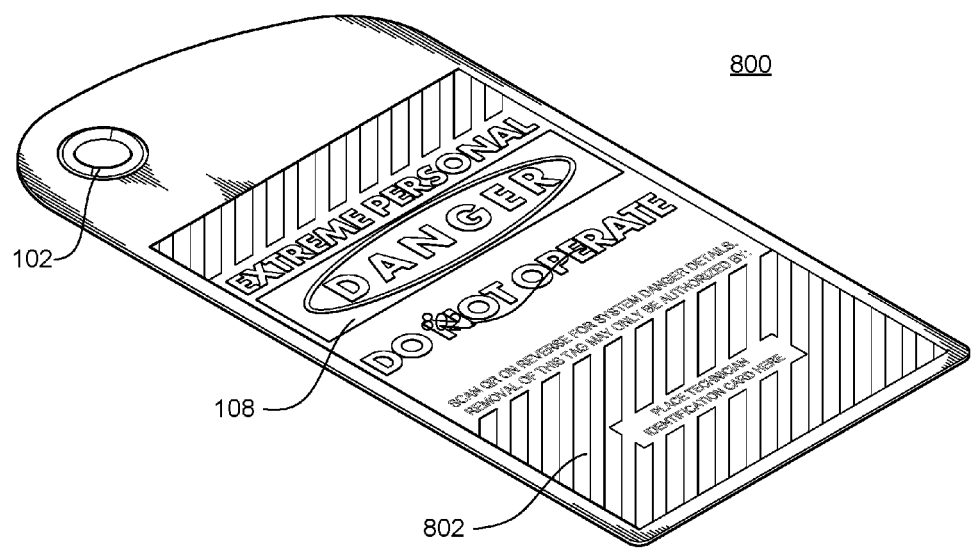
Figures 23, 24:
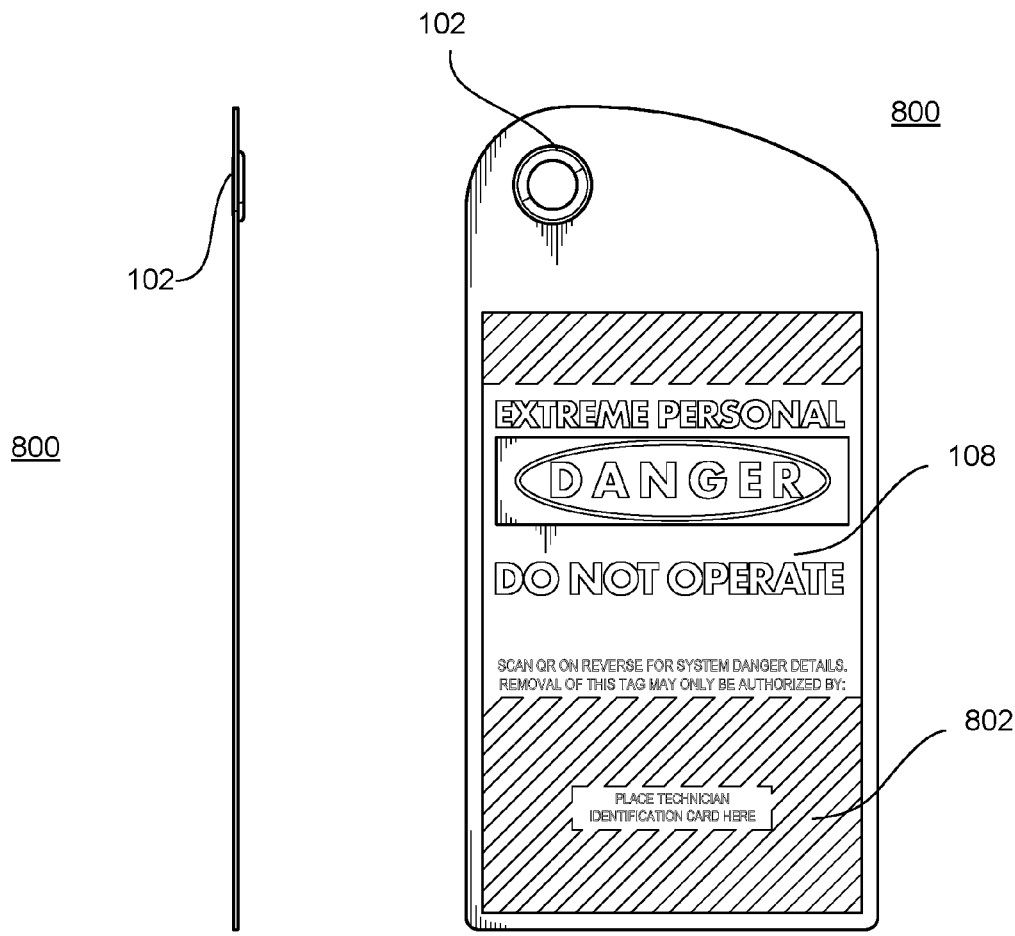
Figure 25:
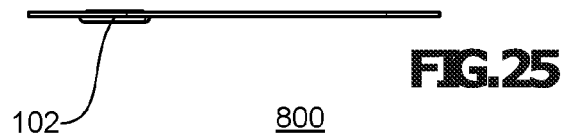
Figure 29:
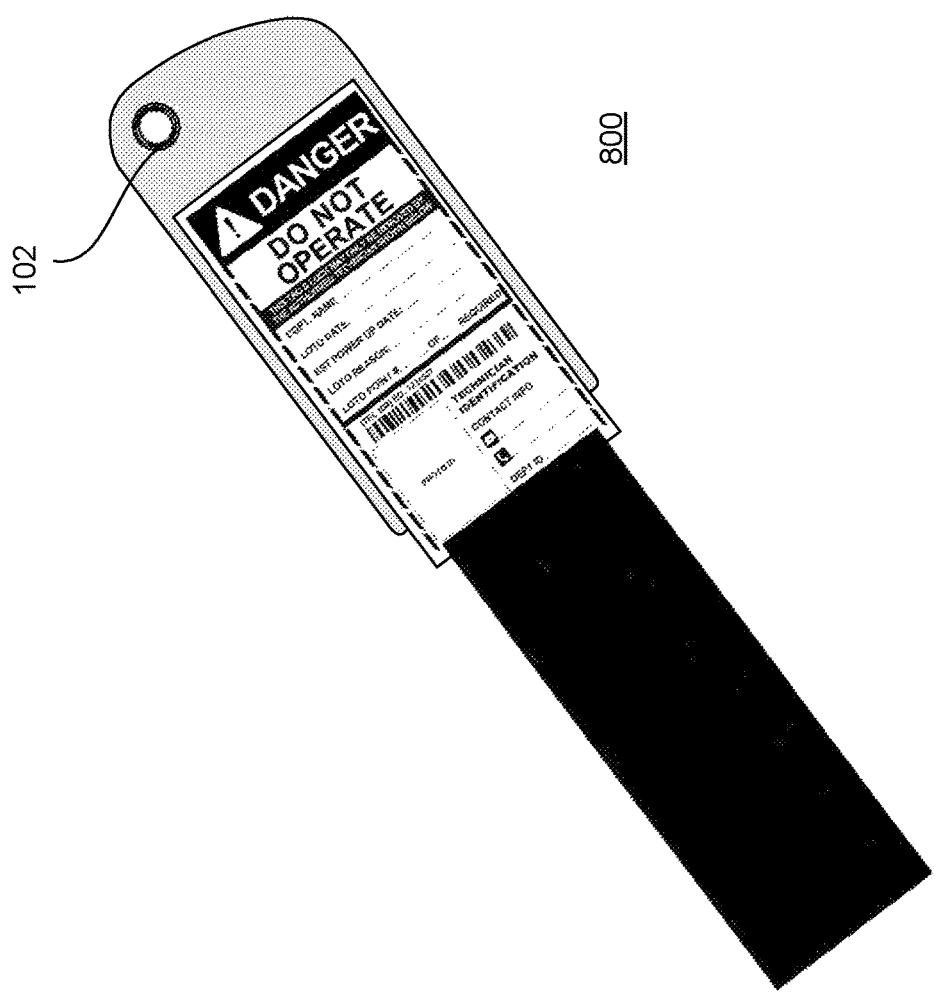

The pouch 800, as depicted in FIGS. 8-14 and 22-29, is approximately 18 cm in length and approximately 9.5 cm wide. The pouch 800 is constructed of two transparent pieces of plastic heat sealed around three edges to form a water-proof or water-resistant pouch interior. One of the pieces of plastic is longer at about 18 cm than the other piece at about 16 cm to enable an eyelet 102 to be placed therein. Below the eyelet 102 comprises a reusable, re-sealable zipper (not shown) located proximate the top of the 16 cm piece. The pouch 800 comprises an eyelet 102 located near the top of the pouch 800 and a warning indicia 108 such as "Caution—the System or Installation is not fit for use". The pouch 800 may be transparent to permit identification media to be inserted into the pouch 800 such as at location 802 where a technician identification card may be placed and readily viewed. The pouch 800 may also receive an electronically-readable code to identify the purpose of the tag. On the backside of the pouch 800, shown in FIGS. 12 and 26, permit the technician to insert a QR code 1202, whereby scanning the QR code 1202 may provide the user with information on the technician, location of the repairs, when the maintenance is scheduled for completion, etc. Alternatively, the QR code 1202 may be fixed preventing the technician from modifying the code. The transparent pouch 800 may also be formed from dry-erase sheets to permit someone to write additional notifications on the exterior of the pouch 800. The technician may also insert pre-printed notices into the pouch 800 and intended for single use, after which they may be discarded.

The lockout tags, such as the flags 100 or pouches 800, may be reflective (retroreflective or otherwise) and fluorescent, such as Reflexite® (Oralite® GP 340 Highlight) produced by Orafol Europe GmbH, and preferably by virtue of a reflective square-shaped pattern 110 heat sealed or high frequency welded directly into the material in order to improve viewing angle of the tags. The flag 100 may comprise a reflective and fluorescent material on one side or both sides. The reflective durable nature of the tag provides increased visibility during various lighting conditions, from varying viewing angles and in out-door rainy/foggy conditions. Reflective tags are also useful in many areas where machinery are generally stored or maintained, for example in warehouses or manufacturing facilities with low lighting conditions. Reflective tags may also be useful in out-of-the-way, hard to see locations or for elevated energy source lockout locations.

The flags 100 may also include a surface with a dry-erase sheet or a dry-erase magnetic surface. These surfaces permit notes or indicia to be applied to the flag 100 directly by a user where special or custom notifications are required. The dry-erase sheet may be provided on one side of the flag 100 or on a portion thereof. In addition, the dry-erase portion may also have permanent markings applied directly thereon. These flags 100 or pouches 800 may also be entirely blank or include blank areas where custom notifications may be imprinted. The dry-erase portion may be protected with a transparent protective cover.

Optionally, a portion or the entirety thereof may be provided in the form of a photo-luminescent surface for particular benefit in low-light, or no-light, environments.

An electronic identification device, such as a mobile phone executing an application, is optionally also provided internal or external to the flag 100 or pouch 800, which includes basic identifying information regarding the machinery to which the flag 100 and/or pouch 800 is applied. The electronic identification device comprises a processor, memory, a scanning device (e.g. image device or wireless scanning device), and at least one transceiver for transmitting and receiving data from a network server. The electronic identification may be in the form of a quick response (QR) code or bar code, a radio-frequency identification device (RFID), or other medium which carries information that can be electronically read or otherwise obtained. Alternatively, the scannable code may provide an index to the information located on a network server that is provided to the electronic identification device. This device may also include information regarding the maintenance or service status that may optionally be updated by the user.

Each of the tags may also be made to conform to lockout/tagout standards, such as the ANSI Z535.2-2011 standard from OSHA standard 1910.147, Control of Hazardous Energy or Lock out/Tag out, which states that "safety signs shall be displayed with illumination or retro-reflectorization as needed for adequate legibility under normal operating conditions. Where illumination is inadequate or colors are not recognizable the use supplemental illumination may be applied.

In another embodiment, the flag 100 and the pouch 800 may be used as a lockout system, wherein the pouch 800 is detached from the reflective flag 100 and used at the energy source lock-out. The flag 100 in turn can be used as a key tag to hang with the lock key from a belt loop to prevent technicians from accidentally taking the key away from the facility. The flag 100 serves to alternatively identify technicians within energy source danger areas. In turn, supervisory technicians may easily identify that the technician has correctly locked out machinery.

The above described embodiments are presented by way of example only. Various modifications and alternatives are also contemplated to fit within the scope of the invention as defined by the claims.

The invention claimed is:

1. A lockout tag comprising:
   an elongate flag having a longitudinal axis and forming a first plane;
   a fastener proximate one end of the elongate flag;
   a seam proximate an end opposite the fastener;
   an indicia between the fastener end and the seam end of the elongate flag; and
   the elongate flag formed of a reflective and fluorescent material;
   wherein the elongate flag is cut, proximate the fastener, substantially along the longitudinal axis, to form two flaps each having a front side and a backside; and
   wherein the two flaps are twisted in opposing directions and fastened to each other at the backside thereof to form a single flap having an end forming a second plane substantially perpendicular to the first plane.

2. The lockout tag according to claim 1, wherein the fastener comprises a circular eye.

3. The lockout tag according to claim 1, wherein the seam comprises at least two layers of a reflective and fluorescent material.

4. The lockout tag according to claim 1, wherein the fastener passes through both flaps.

5. The lockout tag according to claim 1, further comprising a pattern applied to the reflective and fluorescent material.

6. The lockout tag according to claim 5, wherein the pattern is square-shaped.

7. The lockout tag according to claim 1, wherein the reflective and fluorescent material comprises a dry-erase sheet.

8. The lockout tag according to claim 7, wherein the dry-erase sheet is covered with a transparent protective cover.

9. The lockout tag according to claim 1, wherein the indicia is applied using at least one of digital printing, screen printing, woven labeling, or heat transfer printing.

10. The lockout tag according to claim 1, further comprising a pouch with an interior for receiving identification media.

11. The lockout tag according to claim 10, wherein the pouch further comprises an eyelet.

12. The lockout tag according to claim 10, wherein the pouch further comprises a zipper.

13. The lockout tag according to claim 10, the pouch further comprising an electronically scannable code.

14. The lockout tag according to claim 13, wherein the electronically scannable code comprises at least one of a quick response (QR) code, a bar code, and a radio-frequency identification device (RFID).

15. The lockout tag according to claim 13, wherein the electronically scannable code corresponds to an index to data located on a network server.

* * * * *